Figure 1:
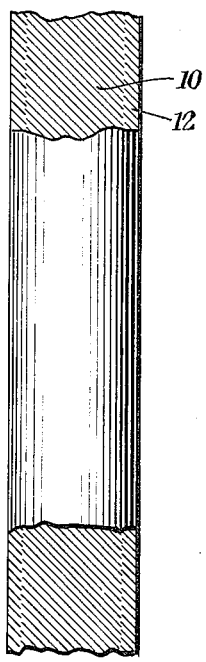

Sept. 1, 1936.   P. A. E. ARMSTRONG   2,052,862
VALVE FOR INTERNAL COMBUSTION ENGINES
Filed Jan. 15, 1935

INVENTOR
Percy A. E. Armstrong
BY
Pridle, Bean & Mann
ATTORNEYS.

Patented Sept. 1, 1936

2,052,862

UNITED STATES PATENT OFFICE 2,052,862

VALVE FOR INTERNAL COMBUSTION ENGINES

Percy A. E. Armstrong, Beverly Hills, Calif.

Application January 15, 1935, Serial No. 1,834

7 Claims. (Cl. 123—188)

This application relates to valves for internal combustion engines made by combining metals or alloys of different characteristics and is a continuation in part of my earlier application, Ser. No. 699,397, filed Nov. 23, 1933.

As is well known, poppet valves for internal combustion engines are subject to the action of corrosive gases and vapors at high temperatures. The effects of these conditions, particularly the high temperatures, tend to be very injurious to the valves, cutting down their life, and it is recognized to be very necessary to cool the valves efficiently. This cooling must substantially all be accomplished through the valve stem, as the shape and use of the valve offers substantially no opportunity for direct cooling of the head, particularly when valve seat inserts are employed.

If the valve is not cooled properly, not only is there the danger of corrosion and scaling (which latter is particularly bad if the change point of the valve comes within the range of operating temperatures) but also the high temperatures may result in changing the physical qualities of the valve, as for example, by creating an undue hardness which may make for brittleness, or by softening at either the seat or the stem. Also there may be stretching due to spring tension, or freezing causing galling in the guides. Further, the expansion may either lift the valve off its seal or cause excessive noise if there is no compensating tappet adjustment.

If one attempts to overcome these difficulties by supplying a large valve stem, there is a tendency to loss of efficiency due to the fact that the stem obstructs the proper flow of gases. Again, if the valve is made large it increases the weight, necessitating stronger springs which add to the stretching trouble and therefore little is gained. A valve of ideal characteristics is one which is resistant to heat and vapor corrosion and has a thermal change point above the temperature of maximum valve temperature operating conditions. The valve must also have sufficient thermal conductivity so that cooling of the stem will quickly influence the temperature of the head and there must be sufficient physical properties to give the necessary strength and wear resistance to the head, stem and tappet end. The valve preferably should be light as to weight and should have a thermal expansion as near as possible to that of the motor block and should have a low "pick up" characteristic at the seat.

Unfortunately, no metal or alloy has yet been found that meets all of the conditions outlined. Attempts have been made to build composite valves, but these have not been entirely successful.

I have found that valves can be produced having excellent characteristics along the lines above set forth where the valve has a core of one type of metal and an outside shell of a different type of metal, but this arrangement is only effective where there is such a bond or diffusion between the core and the shell that the effect is substantially that of a single metal, in which case there is no substantial interference with the transfer of heat. Such an inter-diffusion can be had by welding the shell to the core, using the methods set forth in my Patent No. 1,997,538, April 9, 1935.

In accordance with the process of that application, one or both of the two members which are to be welded together is coated with an electrolytically deposited layer of iron after the surface of such member has been freed from any covering film of oxide or the like which would tend to interfere with diffusion. When this electrolytic deposition is properly carried on it will be found that the iron coating will diffuse with the underbody at temperatures way below the fusion point of the electrolytic iron so that a merging of the two bodies is had. At the same time, the electrolytic iron may be welded to another readily weldable body, for electrolytic iron welds with great ease.

Following this plan of procedure, valves may be made having an external shell of an alloy or metal having the necessary characteristics of resistance to corrosion and wear, and the core can supply the necessary physical strength and thermal conductivity. Due to the fact that the core and shell are merged together without any intervening oxide layer, the conductivity between these two elements will be practically as good as if they were a single homogeneous body and highly efficient cooling can be accomplished. The shell will usually be a chromium containing alloy and may be an alloy of the type now used for making valves or one may even go so far as to use an alloy of chromium and nickel without any substantial quantities of iron, which has most excellent resistance to corrosion or scaling at high temperatures as is now well known. In any event the alloy selected may be chosen for its necessary characteristics of hot ductility and resistance to scaling at elevated temperatures without undue regard to cost, for the fact that only the outer shell is made of this alloy will reduce the cost of the whole. The core may be any type of steel selected to give the necessary physical qualities and may, for example, range from a simple low alloy steel up to one of the high tungsten valve steels containing from 9% to 12% of tungsten and from 3% to 3.5% of chromium. Obviously other alloys may be used for either shell or core.

In carrying out my invention, I first of all form a rod or bar having an outer shell of the heat resistant alloy and a core of steel. One way of forming this bar is to form a tube of the heat-resistant material, then electroplate iron on the inside of the tube under conditions which will eliminate the possibility of any substantial amount of oxide film being present. As brought out in my earlier application above referred to, this may be accomplished by pickling the tube in hydrochloric acid, after which the inside surface is preferably washed clean and then immersed again for a short time in a hydrochloric acid bath which will eliminate any oxide that may have been formed during the washing, and after this the tube, still wet with the hydrochloric acid, is carried to a chloride plating bath where the iron is electrolytically deposited on the inside of the tube. The core of steel having the desired physical characteristics is then prepared either by electroplating iron on its surface under conditions similar to those described, or if the alloy is one which is known to weld easily, its surface may simply be freshly cleaned by pickling or grinding. The bar is then inserted in the tube and the ends of the tube are preferably sealed, as for example, by autogenous welding. The assembled bar is then hot rolled to size.

As an alternative method of carrying out this invention, I form a bar or plate of which one surface (approximately half) is formed of the corrosion-resistant alloy adapted for use at the head of the valve and the other surface or half is formed of an alloy steel suitable for forming the stem of the valve. From this plate slugs are formed by cutting, stamping, pressing or any similar operation and later these slugs can be shaped into a valve preferably by the extrusion process. In such case, the tendency of the metal during extrusion is to flow at a somewhat different speed at the center of the slug from around the outside so that the line of merger of the two types of metal employed will not be directly transverse the stem but will be of a general conical or cup-like shape.

The actual manufacture of valves from the composite bar having the shell of corrosion-resistant metal and the core of steel may be accomplished following any of the well-known procedures, that is, the valve may be made either by the extrusion process in which the initial bar is considerably larger than the finished stem size and the stem portion is reduced by extrusion or "squirting", or the valve may be made by the gathering process in which the initial bar approximates the size of the stem and a portion of the bar is compressed longitudinally to form the enlarged portion which is shaped to form the head of the valve. These two methods are illustrated in the accompanying drawing and examples.

Figure 2:
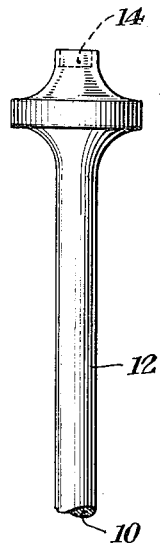
Figure 3:
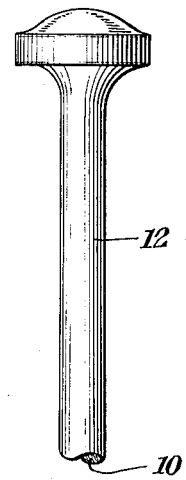
Figure 4:
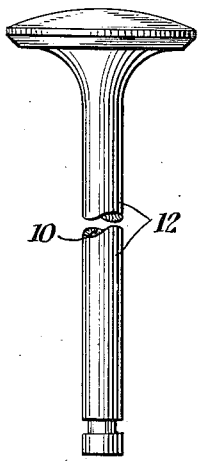
Figure 5:
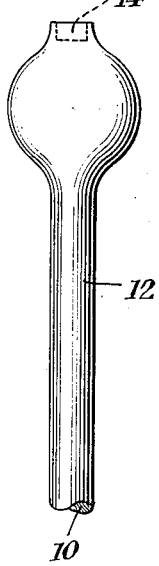
Figure 6:
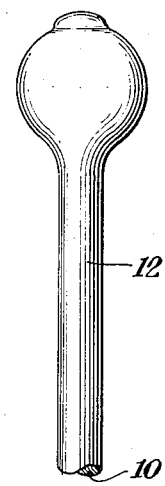

In the drawing, Fig. 1 is a sectional view of a rod or bar made up of composite steel in accordance with my invention; Fig. 2 is a side view with a part in section, showing the shape of the piece after the first extrusion operation; Fig. 3 is a view similar to Fig. 2 showing the part after the next operation had been performed, and Fig. 4 shows the finished valve made according to this process. An alternative construction is illustrated beginning with Fig. 5 which shows the bar after the preliminary hot gathering has been had, and Fig. 6 is a view similar to Fig. 5 showing the next stage of the operation. In this case the finished valve is not illustrated, as it will be substantially identical with the valve of Fig. 4.

In the production of valves shown in Figs. 2, 3 and 4, there is first formed a tube of an appropriate alloy steel such for example as an alloy containing carbon about .20, chromium about 18%, nickel about 9% and silicon about 2.5%. This tube may be formed in any desired way but for usual purposes it will be found preferable that this tube should have a wall thickness not materially greater than 10% of the outside diameter of the tube. This thickness will depend largely on the amount of trimming, grinding, etc. that must be done to the valve, for of course the outside shell should not be perforated by any such operation, and the shell (or at least those portions where corrosion is a factor) should be thick enough so that the corrosion-resistance of the surface will not be materially affected by diffusion between the shell and the electrolytic iron. Except for these limitations the shell of the finished valve should be as thin as reasonably possible, say at a minimum, in the order of about .005 inch for an average on the head. On the lower portion of the stem corrosion does not occur and here the shell may be ground off if desired to increase the thermal transfer from the core metal to the engine body. It is, however, understood that this invention in its broad aspects is not limited to any specific shell thickness for the valve. The tube may be of any desired size but I find an efficient sized tube is one about 5 inches in overall diameter with a side wall about one-quarter inch thick and a length of about 5 feet. If the pickling and plating facilities permit, a longer tube may be advantageous. The tube or plate from which it is made is first pickled to give a clean interior surface and in this case the pickle used was approximately an 18% hydrochloric acid solution and the plate was given an anodic treatment in this solution for about 10 minutes. A graphite cathode was used placed inside the tube, and the current density was about 60 amperes per square foot of surface with a voltage at the generator of about 6 volts. At the end of the ten-minute period the tube was removed and cleaned on the inside with water and then was removed to the pickling bath and made anodic again for one minute and was then carried over (with the hydrochloric acid still covering the inside surface) to the pickling bath.

The plating bath employed was of a chloride type and was made up of 40 ounces of ferrous chloride (FeCl$_2$.4H$_2$O) plus 30 ounces of calcium chloride to the gallon. There was included in the bath just sufficient hydrochloric acid to prevent the solution from becoming cloudy due to the formation of precipitates. The bath was at a temperature of between 195° and 205° F. Anodes of relatively pure iron were employed and inserted axially of the tube and the plating was continued for about 2 hours using a current density of about 60 amperes per square foot area, with the voltage varying between .6 and 1.6 volts. A bar of ordinary mild steel was then prepared with a clean pickled or ground surface which fitted fairly closely inside the tube. The ends were sealed and the assembled bar or billet was hot rolled.

In another instance a plate of alloy steel (of an approximate analysis of carbon .25%, chronium 18%, nickel 25% and silicon 2.75%) was prepared about 15¾" wide, 6' long and ½ inch thick. This was electroplated on both sides following the procedure above set forth, the plating being continued for 2 hours to give a coating of electrolytic iron about .006 inch thick. The plate was then formed into a tube by the use of dies and a bar of alloy steel of good heat conductivity (approximate analysis: carbon .40%, chromium 1.5%, molybdenum .40%) which had been electroplated with iron for one hour as above described was inserted in the formed tube. The joint of the tube was electric welded using electrodes which were slag covered, but gave the same analysis as the plate when deposited, and the weld was built up to a little over the thickness of the plate and ground off at the weld to plate thickness. The ends of the plate at the end of the bar were seam welded to the core with a low carbon steel welding wire. The assembled bar or billet was then hot rolled to desired size. The outside iron coating scaled off during the rolling.

The bars thus prepared may be converted into valves using known methods such as extrusion or squirting, or drawing down by Bradley hammer forging, or by gathering. The problem with the finished forged valve is the exposed core at the head. This may be taken care of either by removing a portion of the core at the head as by boring or the use of acid and closing the shell over the removed portion and welding the shell to the core by forging, or by electrically welding with an electrode of the shell analysis and sealing the core in that manner, or by the use of a plug. It is also possible to give the end of the valve a flash plating of electrolytic iron as above described, after the excess core has been removed, as a preliminary to bending down the shell. The exposed core at the tappet end is desirable, as it could be suitably heat treated to make a hard heat-resistant tappet end. In the illustrations, one form of finishing the head is shown as applied to one type of manufacture and any other method to the other type, but it is understood that these are interchangeable.

In Fig. 1 the numeral 10 designates the core and the numeral 12 the shell. It is to be understood that these are not separate parts but make almost a homogeneous mass, though there is a diffusion zone between the two parts which may be observable under the microscope or at times with the naked eye, after proper etching of the section. This diffusion zone comprises electrolytically deposited iron interdiffused with the shell, and due to the particular manner in which this iron is applied the diffusion zone is substantially entirely free from oxide. This is of great importance, for where oxide is present it has some tendency to reduce the thermal conductivity directly but even more important it inhibits the diffusion or true weld, with the result that there are areas of varying size in which adjacent surfaces are distinct with the result that heat conductivity is enormously reduced.

A bar such as shown in Fig. 1 is rolled to an appropriate size such for example as 1⅜-inch round. This is inserted in the usual extrusion press and pressed to give a contour as shown in Fig. 2. Here it will be noted that a cavity 14 is indicated at the top of the shaped member. This is formed by drilling or removing out a small portion of the core. Preferably this drilling should be so conducted that the diffusion zone of metal is not stripped from the shell. The shell is then bent inwardly to cover the aperture and this is preferably done by a cold operation as by spinning to give a product as shown in Fig. 3. Finally the head of the valve is given its ultimate shape by the usual hot coining operation, to produce a product such as shown in Fig. 4.

In a product made as described, the core and shell were found to be completely welded together, the weld showing excellent diffusion throughout the entire length so that the thermal conductivity was up to the maximum possible and gradually increasing from the shell toward the core with no intervening oxide layer to interfere with the thermal conductivity. The original proportions of shell thickness to total diameter were substantially maintained.

In an alternative method, a bar such as shown in Fig. 1 was rolled to a size of approximately ⅜" diameter. It was then forged or gathered to give a product such as shown in Fig. 5 except that the small aperture at the top was formed by drilling or acid or both. This aperture was then filled by electric welding with metal of the same analysis as the shell, using a welding rod of proper analysis, after which the top was smoothed off as shown in Fig. 6. The valve was finally hot coined to a shape similar to that shown in Fig. 4. Here, as in the previous example, the welding and thermal conductivity were excellent.

Valves thus produced have good physical cores, very excellent heat and corrosion resistant casing or shells and excellent cooling qualities because of the superior thermal conductivity of the core in relation to the shell and due to the fact that there is no impedance to thermal conductivity caused by locally separated areas such as result when an oxide layer is present. As a result, the valves meet substantially all of the characteristics above specified.

It is understood that the specific analyses given and the specific methods of forming the valves are given only by way of illustration and that the same may be modified in many particulars without departing from the spirit of my invention.

What I claim is:

1. A valve for internal combustion engines comprising a surface facing of corrosion-resistant metal, electrolytic iron diffused therewith on the interior surface thereof substantially without intervening oxide and a core of ferrous metal welded in such interior.

2. A valve for internal combustion engines comprising a heat and corrosion-resistant external shell, an iron core of high physical qualities and a uniting zone comprising electrolytically deposited iron diffused with the shell substantially without intervening oxide and welded to the core.

3. A valve as specified in claim 2, in which such shell substantially covers the head of the valve but does not cover the end of the stem.

4. A valve for internal combustion engines having a head portion with at least a surface of corrosion resistant alloy of substantial thickness and a stem portion comprising a hardenable steel of good heat conductivity, said corrosion-resistant head portion and said hardenable steel comprised in the stem portion being united by a diffusion zone comprising electrically deposited iron diffused with the shell portion substantially without intervening oxide.

5. A valve as specified in claim 4, in which the said hardenable steel extends into the head portion and in which such corrosion-resistant alloy extends at least in part down around the stem.

6. A valve as specified in claim 4, in which the head of the valve is substantially homogeneous and the corrosion-resistant alloy extends part way down the stem and is united to the said stem portion of hardenable steel by a cup-like connection.

7. A valve as specified in claim 4, in which the said corrosion-resistant alloy has a thickness of the head portion of at least .005 inch and the stem has a portion substantially free from such shell whereby the thermal efficiency of such stem is increased.

PERCY A. E. ARMSTRONG.